Dec. 2, 1930.   H. V. HOLMAN   1,783,713
ADJUSTABLE CLAMP
Filed Aug. 22, 1927   2 Sheets-Sheet 1
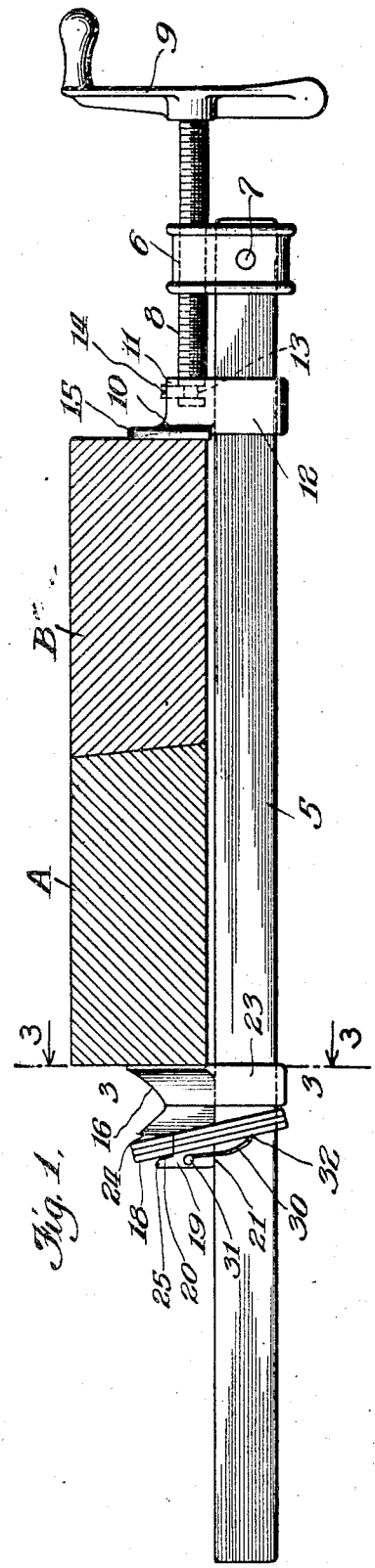
Inventor
Harry V. Holman
By Nissen & Crane attys.

Dec. 2, 1930.   H. V. HOLMAN   1,783,713
ADJUSTABLE CLAMP
Filed Aug. 22, 1927   2 Sheets-Sheet 2
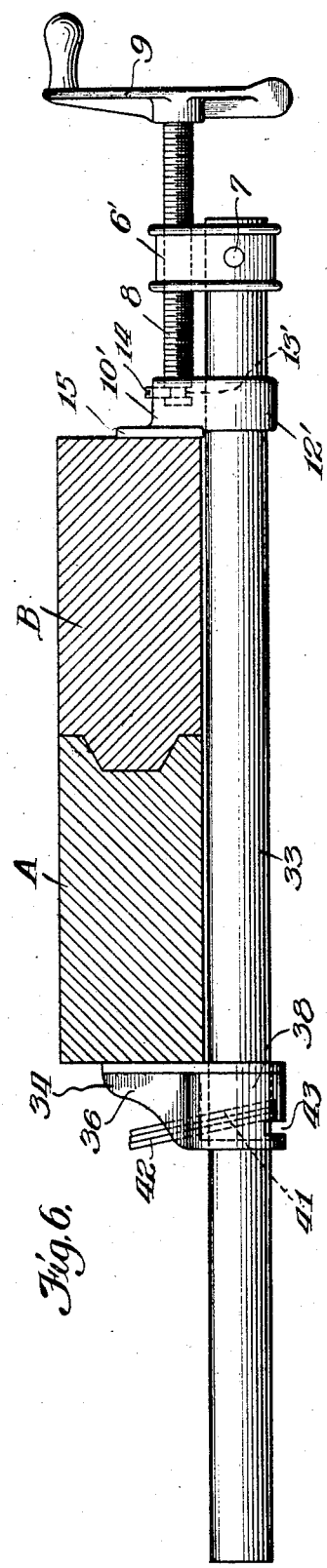
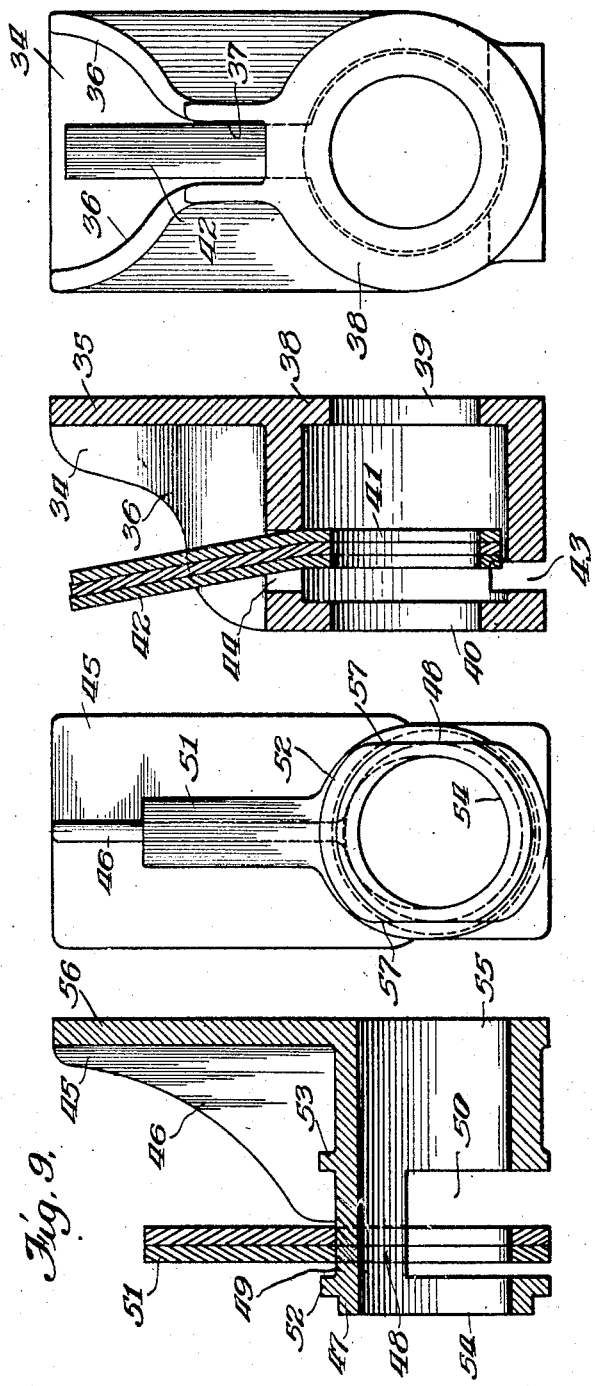

Patented Dec. 2, 1930

1,783,713

UNITED STATES PATENT OFFICE

HARRY V. HOLMAN, OF CHICAGO, ILLINOIS, ASSIGNOR TO ADJUSTABLE CLAMP COMPANY, OF CHICAGO, ILLINOIS, A CORPORATION OF ILLINOIS

ADJUSTABLE CLAMP

Application filed August 22, 1927. Serial No. 214,508.

My invention relates in general to clamping devices and has particular reference to an adjustable clamp designed primarily as a portable work-holding device, although it may be used for various other similar purposes, as, for instance, in holding together two or more work pieces which are to be joined or otherwise worked upon.

One of the principal objects of the invention is the provision of a clamping device which is subject to a very fine yet positive adjustment without sacrificing durability, convenience of manipulation, and other desirable qualities expected in a device of this character.

The invention involves further objects and features which are exemplified in the combination and arrangement of parts shown in the accompanying drawings in which several practical embodiments of the invention are shown.

In said drawings:

Fig. 1 is a view in side elevation of one embodiment of the invention;

Fig. 2 is a top plan view of the embodiment shown in Fig. 1;

Fig. 3 is a vertical section taken on the line 3—3 of Fig. 1;

Fig. 4 is an enlarged sectional view through the clamp and clutch loops;

Fig. 5 is a detail view in elevation of one of the clutch loops;

Fig. 6 is a view in side elevation of a modified form of the clamp;

Fig. 7 is a detail view in longitudinal section of the form of clamping jaw shown in Fig. 6;

Fig. 8 is a detail view in rear elevation of the form of clamping jaw shown in Figs. 6 and 7;

Fig. 9 is a detail view in longitudinal section of another form of clamping jaw; and Fig. 10 is a detail view in rear elevation of the form of clamping jaw shown in Fig. 9.

Referring now in detail to Figs. 1 to 5, inclusive, I have indicated a metal clamping bar 5, which, according to that embodiment of the invention illustrated in Figs. 1 to 5, preferably comprises a relatively long, narrow metal strip having a thickness proportioned substantially as indicated in Figs. 2 and 3. Fixed adjacent one end of the bar 5 is a head 6 which, for all practical purposes, may be made in the form of a slotted yoke with the slot thereof made for the reception of the end of the bar so that a rivet 7 or other suitable securing device may be used to fix the head upon the bar substantially as shown. The headed part of the yoke is made with a threaded internal bore through which the clamping screw 8 extends. This clamping screw is provided at one end with a suitable handle 9 and the opposite end of the screw is mounted to the clamping jaw 10 through the medium of a connection which permits rotation of the screw for advancing or retracting the clamp 10 relatively of the head 6. A connection for the screw with the head for this purpose may be realized by arranging an internal bore at the upper end 11 of the yoke part 12 of the clamp for the reception of the end of the screw and with a reduced diameter 13 adjacent the end of the screw providing an annular recess in which the set screw 14 is seated. Such a connection will permit freedom of rotation for the screw 8 yet connecting it to the clamping jaw 10 so that the same may be slid on the bar 5 relatively of the head 6 by turning the handle 9.

The yoke part 12 of the clamp 10 is made with a slot for the reception of the bar 5 with the fit of the bar in the slot such as to prevent unnecessary wobbling of the clamp 10 but at the same time permitting a free sliding movement of the clamp. The face 15 of the clamp is presented in a position over the bar 5 where it will most conveniently engage the work piece or pieces to be clamped.

A co-operating clamping jaw 16 is slidably mounted on the bar 5 so as to clamp a work piece between it and the clamp 10. To best identify these clamps 10 and 16, the same may be considered as clamping jaws, and, as an example of the work pieces which they are intended to clamp, I have illustrated blocks A and B. The clamp 16, like the clamp 10, has a clamping face 17 which is presented in confronting relation to the face 15 and in substantially the same fixed plane, although, of course, one of the faces may be elevated or projected at an angle to the other face, if any advantage will be gained thereby.

The principal features of the invention reside in the construction and co-operative relationship of the parts making up the clamp 16 and its engagement with the bar 5. As heretofore practiced, considerable difficulty has been experienced with devices of this kind when it becomes necessary to effect a fine sliding adjustment of one of the clamps. Of course, it is realized that the clamp which is actuated by the clamping screw may be subject to a more or less fine adjustment but this is frequently insufficient as in order to provide an entirely practical device, both of the clamps should be capable of a fine adjustment. I have accomplished this by employing a plurality of clutch loops 18 for arresting the sliding movement of the clamp 16. These clutch loops are used in lieu of the old devices which have been heretofore provided for a similar purpose. To accommodate the clutch loops to the clamp 16, the clamp is made with a saddle piece 19 which projects from the rear of the face 17 of the clamp and has a saddle-like notch 20 cut in its upper edge for supporting the clutch loops. The lower edge 21 of the saddle piece is concave with the curvature thereof corresponding to the rounded upper edge 22 of the bar 5. The saddle piece 19 is made as an integral part of the clamp 16 as well as an integral part of the yoke 23 of the clamp which has a slot by means of which the clamp is slidably mounted on the bar. The notch 20 in the saddle piece 19 is cut so as to leave an elevated shoulder 24 as a forward rest for the clutch loops. The face of this rest is perpendicular so that when the clutch loops are moved from a slanting, gripping relation relative to the bar 5 into a perpendicular inactive position, the face of the shoulder 24 will stop them in a true perpendicular position, thus permitting the clamp 16 to be freely slid on the bar 5. The opposite face 25 of the notch may be slanted rearwardly so as to be parallel with the clutch loops when they are projected into a slanting active position. In lieu of this slanting face 25, the width of the notch may be such as to enable the plates to be projected into an active position.

The clutch loops of this form of the invention may be stamped or otherwise formed from relatively short lengths of metal strips, and, as clearly shown in Fig. 5, each will be provided with a closed slot 26 of a width to accommodate the bar 5 and a length to encircle the saddle piece 19 and the bar 5 with the upper ends 27 of the slots resting on the saddle of the notch 20. The lower ends 28 of the slots 26 will be curved to correspond to the rounded lower edge of the bar 5 which they engage when in a slanted active position for locking the clamp 16 in any adjusted position throughout the length of the bar. To insure a positive locking engagement of the clutch loops with the lower edge of the bar, the bar may be serrated or otherwise provided with a plurality of fine notches 29. There is an important advantage to be gained in using a plurality of these clutch loops in lieu of one relatively thick plate. The clutch loops are approximately $\frac{1}{16}$ of an inch or less in thickness.

If one plate is used, it would have to be thick enough to provide a rigid and non-bendable lock, and any such plate thick enough for this purpose would not be capable of a fine adjustment for the clamp 16. By using a plurality of these loops, I can still realize the desirable fine adjustment of the clamp while providing a combined thickness which will rigidly hold an adjustment. Where a single thick bar is used, instead of individual loops, and where the slide bar 5 is provided with adjusting notches, each adjustment step must be at least equal to the thickness of the single thick bar because the notches must be spaced-apart this distance. Where a plurality of loops is used, the adjustment may be finer because more notches can be used, as many more notches as there are plates since each plate receives a notch. Even where no notches are used, the gripping effect would be greater. Referring to the enlarged view in Fig. 4, it will be readily apparent that the loops may be so disposed that the right hand edge of each loop may engage the bottom of bar 5 instead of merely one edge, as would be the case if an integral member were used.

Although it is not altogether necessary, I would much prefer to use a spring tension device for holding the clutch loops 18 in their slanting active position. This may be conveniently accomplished by employing a leaf spring 30 on each side of the bar 5. The upper ends of these leaf springs may be secured to opposite sides of the saddle piece 19 by rivets or the like 30 with the opposite ends 32 of the springs bearing against the clutch loops and holding them under tension in their slanted active position. In order to make a sliding adjustment of the clamp 16, the clutch loops may be tilted against the resistance of the springs 30 into their inactive perpendicular position which will release the lower ends 28 of the slots 26 from gripping relation with the serrated edge 29 of the bar and free the clamp so that it may be slid back and forth on the bar. The length of the slots 26 is greater than that of the distance between the saddle of the notch 20 and the serrated edge 29 of the bar 5 so that when the clutch loops are in an inactive perpendicular position, the bar will slide freely through the slots 26.

The same principle of construction and operation will be found in the embodiments of the invention illustrated in Figs. 6 to 10, inclusive. In both of these modified forms, a pipe or other tubular body 33 is used as a bar in lieu of the flat bar 5. The fixed head 6' is constructed practically the same as the head 6 only the slot which mounts the same to the bar is shaped to accommodate the pipe 33. The same change is effected in the yoke 12' for the clamp 10' otherwise there is no special necessity of changing the other detail construction of these parts and they are numbered the same reference characters in Fig. 6 as in Figs. 1 and 2. The opposite clamp in these modified forms is somewhat materially changed, and in this connection, taking first the modified form shown in Figs. 6 to 8, inclusive, the clamp 34 is made with a clamping face 35, the back of which has a pair of spaced parallel webs 36 which are curved inwardly to provide an open slot 37 and then merge into the barrel 38 which encircles the pipe 33. The pipe 33 extends through the barrel so as to slidably mount the clamp on the barrel.

The clamp 34, like the clamps 10 and 16, is preferably a casting, the barrel part thereof having co-axially arranged openings 39 and 40 in its opposite sides through which the pipe 33 extends and with the diameter of the openings 39 and 40 substantially that of the diameter of the pipe but of course large enough so as to provide an unobstructed free sliding movement of the clamp on the pipe. The internal area or diameter of the barrel 38 is larger than the openings 39 and 40 and provides a housing for the clutch loops 41. Each of these loops comprises a circular disc-like part having an opening to loosely fit the pipe 33 and an upstanding tongue 42. The clutch loops are inserted into the barrel through a crescent-shaped slot 43 in the bottom of the barrel and their tongues 42 extend through a squared opening 44 in the top of the barrel through the slot 37. In this case, as in the other embodiments, I prefer to use a plurality of these clutch loops to develop a strong, durable and rigid clutching device which is capable of providing a very fine adjustment for the clamp. The clutch loops 41 are manipulated into a perpendicular position, at least the openings through the same are co-axially alined with the pipe 33 when it is desirable to slide the clamp on the pipe. This manipulation of the loops may be accomplished by the upstanding tongues 42. When the loops are in an active clutching relation relative to the pipe 33, they will be tilted so that their axis is at an angle to the axis of the pipe; in other words, they will be slanted as in the case of the loops 18.

When the pipe 33 is used as a bar, it will not be necessary to serrate or otherwise mutilate the under side of the same as a desirable clutching effect can be produced with the clutch loops 41 without the aid of any such serrations.

In Figs. 9 and 10, I have shown still another form of clamp, the same being somewhat similar to the clamp 34 except in this case the clamp which is identified by the numeral 45 has a single web 46 which terminates in a mutilated barrel 47 for the insertion of the same over the pipe 33. The clutch loops 48 for this embodiment are substantially the same as the clutch loops 41 but instead of being confined within the barrel, the openings thereof encircle an arcuate saddle 49 on top of the barrel, the saddle being produced by cutting out a relatively large area 50 from the under side of the barrel. The tongue pieces 51 of the loops are presented in an upstanding position as in the case of the tongues 42 and the loops are confined on the saddle 49 by annular rims 52 and 53. The barrel 47 is made with open ends 54 and 55 through which the pipe 33 is inserted and the diameter of the openings in the loops 48 which are left exposed below the saddle 49 may be co-axially disposed relatively to the openings 54 and 55 so as to leave an unobstructed opening through the barrel for the pipe 33, thus permitting the clamp 45 to freely slide on the barrel when the loops are disposed in a perpendicular position. By manipulating the fingers or tongues 51 to move the loops into a slanting position where the openings therein will be positioned at an angle to the axis of the pipe, they will effect a gripping or clutching engagement with the pipe, thus arresting the sliding movement of the clamp on the pipe the same as in the other embodiments. The clamp 45 is provided with a face 56, substantially as in the other embodiments. This clamp may be made as a casting.

The clutch loops 18 for the clamp 16 may be removed and replaced by new loops at any time by sliding the clamp 16 off the bar 5, the loops being then readily removed from the clamp by presenting the slots 26 above the shoulder at the rear of the recess 20. The clutch loops 41 may also be removed from the barrel 38 of the clamp 34 through the crescent-shaped slot 43 so that they may be renewed when occasion demands.

For renewing the clutch loops 48, I have made the metal around the opening 54 with the flat sides 57 and the flange 52 smoothed off at these sides so that by turning the loops at a ninety degree angle from their normal upstanding position, they may be removed from the end of the barrel.

From the above, it will be seen that by the use of a multiplicity of these clutch loops, I can provide a very fine yet positive adjustment for one of the clamps without sacrificing a sufficient amount of metal for developing strength and durability. Furthermore, any one of the forms described may be manufactured at a cost which will enable the clamp to be sold at a reasonable price which should insure its popularity with the trade, especially in view of the improved construction which it offers in a device of this kind.

Obviously those skilled in the art may make various changes in the details and arrangement of parts without departing from the spirit and scope of the invention as defined by the appended claims, and I therefore do not wish to be restricted to the precise construction herein disclosed.

I claim:—

1. A clamp comprising a rod, a jaw slidable along said rod, and means for preventing movement of said jaw along said rod comprising a plurality of clutch loops having openings therein through which said rod extends, said clutch loops having means thereon engaging said jaw so that when said jaw moves in one direction the clutch loops are tilted to bring the edges of said openings into gripping engagement with said rod and thereby prevent any further substantial movement of said jaw along said rod, each of said clutch loops being relatively thin as compared to the size of its opening, the combined thickness of said clutch loops being sufficiently great to withstand the normal clamping pressure without material permanent distortion, but each individual clutch loop being so weak as to be materially and permanently distorted by normal clamping pressure when used by itself, the distortion of the clutch loops tending to cause each clutch loop to more firmly grip said rod.

2. A clamping device comprising a clamping bar, a jaw slidably mounted on said bar, a plurality of flat relatively thin members having openings therein surrounding said bar, said members having a thickness of less than one-fourth the diameter of said bar and being constrained to move with said jaw, each of said members being adapted to exert a clamping effect upon said bar, the edges on opposite sides of said openings and upon opposite sides of the relatively thin members engaging said bar at points spaced along said bar, the thickness of each individual member being unable to resist the normal clamping pressure without bending materially, but the aggregate resistance of all members being sufficient to prevent any substantial bending of the members.

In testimony whereof I have signed my name to this specification on this 19th day of August, A. D. 1927.

HARRY V. HOLMAN.